Figure 2B:
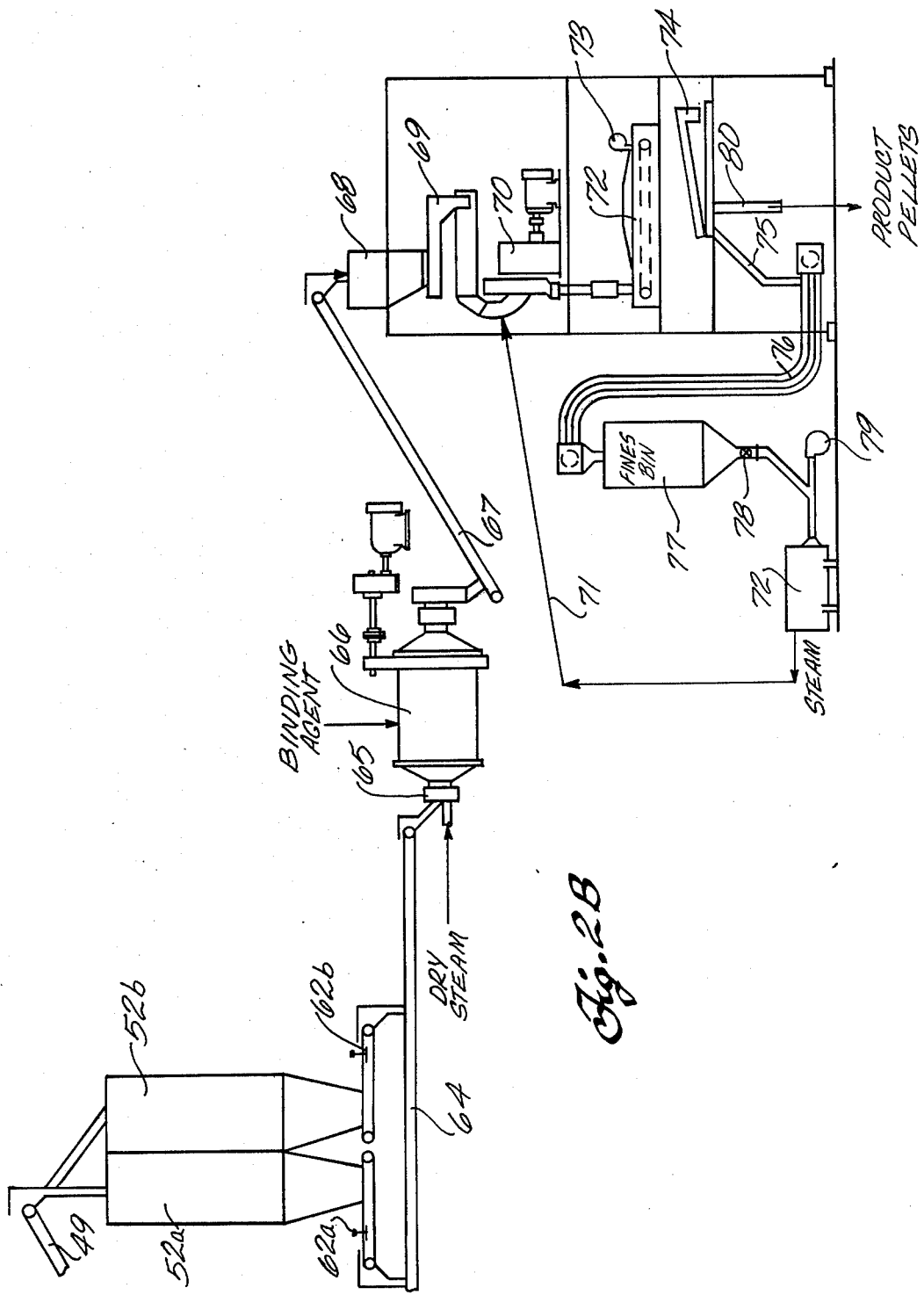

United States Patent [19]

Johnston

[11] 4,236,897

[45] Dec. 2, 1980

[54] FUEL PELLETS

[76] Inventor: Ian F. Johnston, 1682 Marguerite Ave., Corona Del Mar, Calif. 92625

[21] Appl. No.: 943,393

[22] Filed: Sep. 18, 1978

Related U.S. Application Data

[63] Continuation-in-part of Ser. No. 900,240, Apr. 26, 1978, abandoned.

[51] Int. Cl.³ .......................... C10L 5/02; C10F 7/06; C10L 5/14
[52] U.S. Cl. .................... 44/10 A; 44/10 B; 44/16 C; 44/25; 44/32
[58] Field of Search .................. 44/10 B, 21, 25, 32, 44/10 A, 16 C

[56] References Cited

U.S. PATENT DOCUMENTS

| | | | |
|---|---|---|---|
| 150,537 | 5/1874 | Daddow | 44/16 C |
| 607,528 | 7/1898 | Strong | 44/32 X |
| 700,421 | 5/1902 | Helbing | 44/32 |
| 1,503,304 | 7/1924 | Damon | 44/15 D |
| 2,475,766 | 7/1949 | William et al. | 44/14 |
| 2,475,767 | 7/1949 | Williams et al. | 44/10 R |
| 2,475,769 | 7/1949 | William | 44/10 R |
| 3,836,343 | 9/1974 | Romey et al. | 44/25 |
| 3,843,336 | 10/1974 | Messman | 44/25 |
| 3,852,046 | 12/1974 | Brown | 44/25 X |
| 3,947,255 | 3/1976 | Hartman et al. | 44/25 |
| 4,015,951 | 4/1977 | Gunnerman | 44/10 E |

FOREIGN PATENT DOCUMENTS

| | | |
|---|---|---|
| 553804 | 3/1958 | Canada . |
| 1018763 | 10/1977 | Canada . |
| 17863 | of 1901 | United Kingdom ............ 44/16 C |
| 901789 | 7/1962 | United Kingdom ............ 44/25 |
| 1046250 | 10/1966 | United Kingdom ............ 44/25 |

OTHER PUBLICATIONS

Wood Fuel Preparation by L. H. Reineke, Forest Products Laboratory Report, FPL-090.
Briquets from Wood Residue, by L. H. Reineke, U.S. Forest Service Research Note, FPL-075, Nov. 1964.

*Primary Examiner*—Carl F. Dees
*Attorney, Agent, or Firm*—Christie, Parker & Hale

[57] ABSTRACT

A high heating value, fuel pellet comprises from about 50 to about 99% by weight natural cellulosic material and from about 1 to about 50% by weight synthetic polymeric thermoplastic material. The synthetic thermoplastic material is uniformly distributed throughout the fuel pellet. The thermoplastic material is solid at room temperature and has an injection molding temperature of at least 200° F. Such a fuel pellet can be prepared in a pelletizer where the temperature of the pellet as it emerges from the die is from about 150 to about 250° F.

21 Claims, 3 Drawing Figures

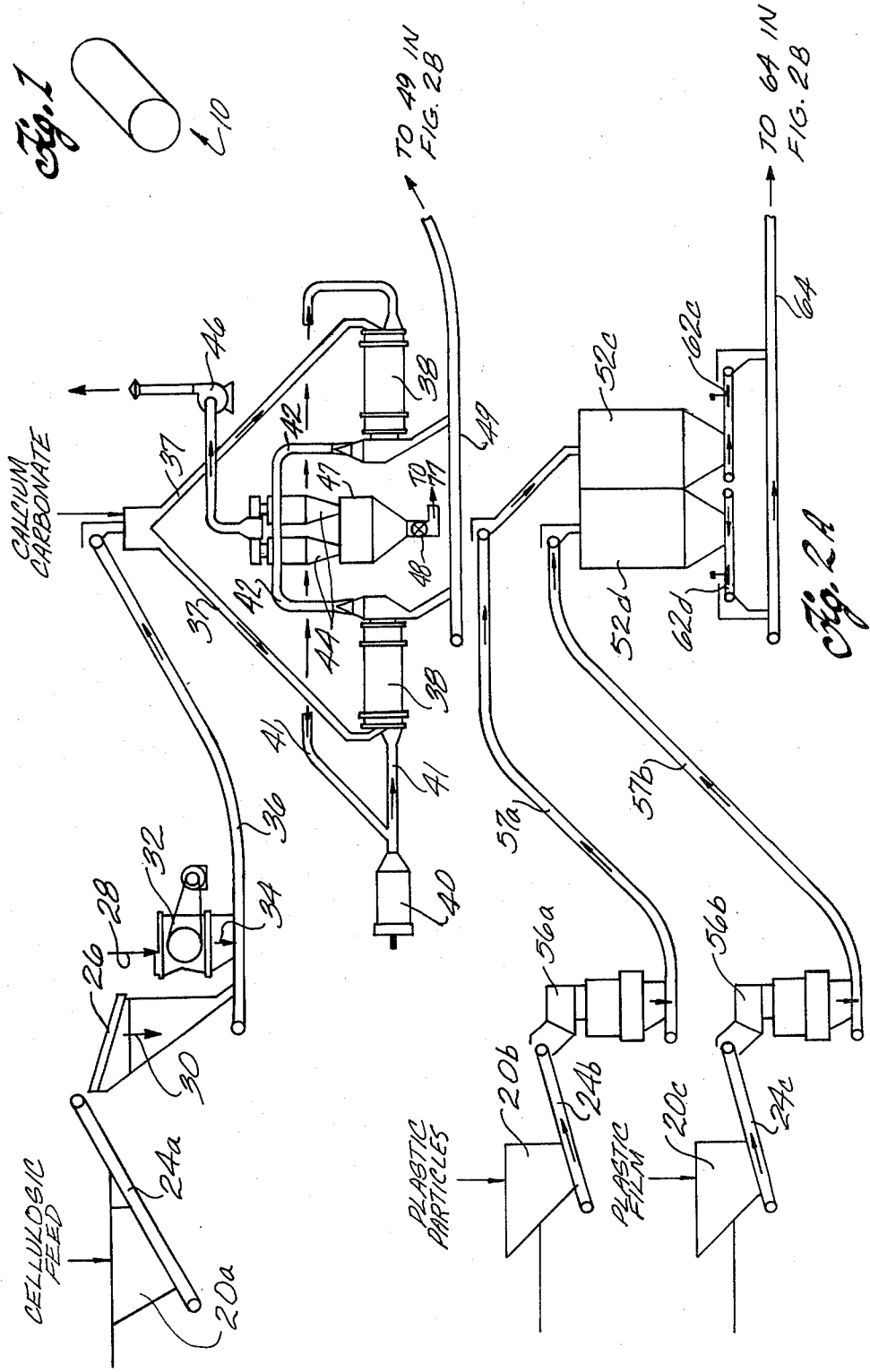

FUEL PELLETS

CROSS REFERENCE

This application is a continuation-in-part of my co-pending patent application Ser. No. 900,240, filed on Apr. 26, 1978, and now abandoned which is incorporated herein by this reference.

BACKGROUND OF THE INVENTION

Due to diminishing quantities of coal, petroleum, and natural gas products, attention is being directed to other energy sources, including oil shale, solar energy, and nuclear energy. One source which is receiving considerable attention is biomass materials such as wood and its byproducts. This is somewhat ironic since the original source for energy in the United States and the rest of the world was wood. In fact, U.S. Pat. No. 43,112 issued on June 14, 1864 was directed to combining sawdust, tar, wood cuttings or chippings, water, and coal-tar to form an artificial fuel.

Recently, much attention has been directed to preparing briquets from wood waste. For example, L. H. Reineke wrote a U.S. Forest Research Note entitled "Briquets from Wood Residue", in November, 1964 describing various techniques available for briquetting wood residue. In addition, U.S. Pat. Nos. 3,227,530, 3,635,684, 3,843,336, 4,015,951 and 4,043,764 describe techniques for briquetting cellulosic material.

Use of available pelletized wood waste as a fuel source has achieved only limited acceptance to date. One reason for this is the relatively low heating value of pelletized wood as compared to coal. Pelletized wood can have a heating value of less than 7,000 BTU's per pound, while coal generally has heating value in excess of 9,000 BTU's per pound. Therefore, the transportation and handling costs associated with available pelletized wood are higher per BTU than for coal.

Other problems with use of available pelletized wood as a fuel source is that it has a slow burning rate and it exhibits imcomplete burnout, resulting in formation of carbonaceous residues and low combustion efficiency. In addition, pelletized wood can be harder to ignite than coal and pelletized wood can be more fragile than coal, requiring special handling to avoid crumbling and to prevent weathering. To overcome the crumbling and weathering problems, inorganic binders such as cement and silicate of soda, and organic binders such as tar, pitch, rosin, glues, and fibers have been included in the pellets. However, no binder has been found which solves the above problems, and which also is inexpensive and does not reduce the heating value of the wood.

It has been attempted to use the self-binding characteristics of various species of wood due to lignin present to avoid the crumbling problem. This can be effected with some species of wood, but not all species, by heating the wood above its minimum plastic temperature of 325° F. as reported by Reineke in the above-mentioned U.S. Forest Service Research Note, and also as reported by Gunnerman in the above-mentioned U.S. Pat. No. 4,015,951. However, such high temperatures can severely limit the operating life of the pelletizing equipment and drive high BTU volatile components from the wood.

Therefore, there is a need for a fuel pellet which resists crumbling, is easily ignitable, burns fast and completely, and has a heating value approaching that of coal; and there is also a need for a method for preparing the fuel pellet which does not require high pelletizing temperature.

SUMMARY

I have now invented a fuel pellet with the above features and a method for preparing the fuel pellet. The fuel pellet, which preferably has a minimum dimension of at least 3/16 inch for ease of handling, comprises from about 50 to about 99% by weight natural cellulosic material, and from about 1 to about 50% by weight synthetic polymeric thermoplastic material. The thermoplastic material is chosen so it is solid at room temperature and has an injection molding temperature of at least 200° F. The thermoplastic material serves to bind the pellet together, increases the heating value of the pellet, lubricates the pelletizing die, and improves the ignition and burning characteristics of the pellet. Fuel pellets of the present invention exhibit complete burnout, burn faster than pellets not containing thermoplastic material, and can have a heating value in excess of 9,000 BTU's per pound. Preferably, the thermoplastic material is uniformly distributed throughout the fuel pellet.

The fuel pellet can be made by preparing a feed comprising from about 50% to about 99% of particulate natural cellulosic material and from about 1% to about 50% by weight of particulate synthetic thermoplastic material. The cellulosic material has a free moisture content of from about 5 to about 15% by weight, and preferably substantially all of the cellulosic material is −5 mesh. Substantially all of the thermoplastic material is −5 mesh, and preferably −10 mesh. The plastic and cellulosic materials are intimately combined by compressing the feed in a die.

DRAWINGS

These and other features, aspects and advantages of the present invention will become more apparent upon consideration of the following description, appended claims, and accompanying drawings where:

FIG. 1 illustrates in a perspective view a pellet representative of pellets prepared according to the present invention; and FIGS. 2A and 2B illustrate a process embodying feature of the process of the present invention. These two figures are to be considered serially.

DESCRIPTION

With reference to FIG. 1, there is shown a fuel pellet 10 prepared from cellulosic material and thermoplastic material. Fuel pellet 10, which is cylindrical in shape, has a minimum dimension of at least 3/16 inch and comprises from about 50 to about 99% by weight natural cellulosic material and from about 1 to about 50% by weight thermoplastic material. As is more fully set forth below, these fuel pellets are easily ignitable, burn evenly, quickly and completely, resist weathering, and generally have a gross heating value in excess of 9,000 BTU's per pound, and can have a gross heating value in excess of 10,000 BTU's per pound.

The natural cellulosic material used to form the pellets 10 can be particulate woody material such as sawdust, wood shavings, sander's dust, hog fuel, peat, and bark. Agricultural waste such as banana and papaya stalks, straw, bamboo, jute, bagasse, corn husks, corn cobs, cotton "gin trash", sisal, seed hulls, and peanut hulls can also be used. Also, paper and cardboard can be included in the pellets. Combinations of the above natural cellulosic materials can also be used. Preferred natural cellulosic materials are those with low moisture content to minimize drying costs and low contamination levels to minimize pelletizer die wear. As used herein, the term "cellulosic material" includes lignin.

Particulate woody material preferably is used in the pellets because it has a higher heating value and lower moisture content than agricultural waste. Inclusion of banana and/or papaya stalks in the pellets is desirable because banana and papaya latex are good binding agents and contribute to the cohesiveness of the pellets.

The synthetic thermoplastic material can be practically any available synthetic thermoplastic such as, but not limited to, polystyrene, polyethylene, polypropylene, acrylonitrile-butadienestyrene, acetal copolymer, acetal homopolymer, acrylic, polybutylene, and combinations thereof. Although thermoplastics containing a halogen such as polyvinylchloride can be used, for most applications there are to be avoided, because of corrosion and emission problems associated with the combustion products of halogen-containing thermoplastics. It has been noted that for fast burning and ease of ignition of the fuel pellets, polypropylene and polyethylene are the preferred synthetic thermoplastic materials.

The term "synthetic thermoplastic materials" excludes naturally occurring thermoplastic materials and naturally occurring cellulosic materials. For ease of handling, the synthetic thermoplastic material must be solid at room temperature. Preferably the synthetic thermoplastic material has an injection molding temperature of at least 200° F. The minimum injection molding temperature of common thermoplastics as reported in *Modern Plastics Encyclopedia*, Vol. 49, McGraw-Hill, 1972–3 Edition, is presented in Table 1.

TABLE 1

| Synthetic Thermoplastic | Minimum Injection Molding Temperature (°F.) |
| --- | --- |
| Polystyrene | 325 |
| Polyethylene | 250 |
| Polypropylene | 375 |
| ABS | 360 |
| Cellulosics | 335 |
| Nylon | 360 |
| Polyesters | 270 |

It has been found difficult to pelletize a feed containing more than about 1.25% by weight high impact polystyrene. It was noted that pelletizer production rate decreased with such a feed and it was difficult to thoroughly disperse the high impact polystyrene in the pellets. Therefore, when the pellets include high impact polystyrene, it is preferred that feed to a pelletizer contains only up to about 1.25% by weight high impact polystyrene. It is desirable to include polystyrene in the pelletizer feed because it has been found that polystyrene contributes greatly to the cohesiveness of the fuel pellets. Such cohesiveness is important because it is undesirable for the pellets to break or disintegrate during handling and storage. Such breakage and disintegration can produce fines and dust, which can be a serious fire and explosion hazard.

It is critical to the present invention that at least 1% by weight thermoplastic material be included in the fuel pellets. This is because fuel pellets containing thermoplastic material have many significant advantages compared to fuel pellets containing only cellulosic material. For example, inclusion of thermoplastic material in fuel pellets allows the fuel pellets to be formed easily in a pelletizer at temperatures lower than temperatures required for forming a fuel pellet with only cellulosic material. Thus, the thermoplastic material serves as a processing aid for forming pellets from the cellulosic material. In addition, the thermoplastic material has a higher heating value than the cellulosic material, and the resulting pellets have a correspondingly high heating value.

Another advantage of the presence of synthetic thermoplastic material in fuel pellets is that the thermoplastic material provides a substantially water-impervious coating, or sheath on the outside of the pellets, thereby both preventing uptake of moisture by the pellets and resisting weathering in storage. Because of the uniform distribution of the plastic in the pellets, there is plastic even at the ends of a cylindrical pellet. This also prevents uptake of water by the pellets. Furthermore, the hydrophobic nature of the plastic prevents water uptake. Pellets of the present invention have been left out overnight in the rain and still maintained their cohesiveness, while conventional wood pellets tend to disintegrate when wet.

A portion of the thermoplastic material can be in the fuel pellets in the form of discrete subparticles, although it is preferred that the thermoplastic material be substantially uniformly distributed throughout the particles. The presence of discrete thermoplastic subparticles in fuel pellets results in easy ignition because the discrete subparticles provide an ignition situs.

Surprisingly, it has been found that the fuel pellets exhibit burning and ignition characteristics which are superior to the burning and ignition characteristics of both the cellulosic material and thermoplastic material which make up the fuel pellets. The fuel pellets are a new composition of matter. For example, burning tests were conducted with (1) conventional fuel pellets made only with sawdust, (2) polypropylene, and (3) fuel pellets according to the present invention prepared with 91% by weight sawdust (different from the sawdust used for the all sawdust pellets) and 9% by weight polypropylene. The all sawdust fuel pellets burned at a rate equal to about ½ the rate of the fuel pellets of the present invention. The two types of fuel pellets were about the same size, but it should be noted that the all sawdust fuel pellets were denser than the sawdust/polypropylene fuel pellets, but this accounts for only part of the difference in burning rate. It has been noted that fuel pellets containing plastic burn faster than less dense conventional all-wood pellets. Therefore, in a boiler of a fixed size, the fuel pellets of the present invention can be used to generate heat and steam at a faster rate than conventional fuel pellets. In addition, the sawdust/polypropylene fuel pellets left practically no residue, while the conventional fuel pellets left a carbonaceous residue. Furthermore, the fuel pellets consisting only of thermoplastic material did not burn completely, but kept self-extinguishing. This was not a problem with the fuel pellets of the present invention. Therefore, fuel pellets prepared from cellulosic material and plastic material burn better than either the cellulosic material alone or the plastic material alone.

It is believed that thermoplastic material in fuel pellets acts as a binder for the cellulosic materials, and in fact is just about the perfect binder. This is because the cost of the thermoplastic materials is minimal, since much scrap and waste plastic is readily available. Pellets containing at least 5% by weight thermoplastic material have been demonstrated to have sufficient toughness to withstand exposure to the shocks of transportation, storage, and stoking. When a pellet includes thermoplastic material, crumbling and excessive softening from weathering are avoided. Furthermore, thermoplastic materials typically have a higher heating value than cellulosic material. The pellets should contain at least 1% by weight of the thermoplastic material, and more preferably at least about 2.5% by weight, to obtain these advantages.

The fuel pellets can contain as much as 50% by weight thermoplastic material to maximize their heating value. However, preferably the pellets contain no more than about 25% by weight thermoplastic, and more preferably no more than about 10% by weight, because thermoplastic material is more expensive than waste cellulosic material. In addition, if the pellets contain more than about 25% by weight thermoplastic material, the burning properties of the pellets can be adversely affected.

Therefore, the pellets of the present invention comprise from about 50 to about 99% by weight cellulosic material, and from about 1 to about 50% by weight thermoplastic material. Preferably, the fuel pellets contain from about 1 to about 25% by weight thermoplastic material, and more preferably from about 2.5 to about 10% by weight thermoplastic material.

Materials other than natural cellulosic material and synthetic thermoplastic materials can be included in the pellets. For example, materials such as comminuted tires, thermosetting resins and/or petroleum distillation residue can be added to improve the heating value of the pellets.

Oxidizing agents such as sodium perchlorate and ammonium nitrate to facilitate combustion can also be included in the pellets. Also, binding agents in addition to thermoplastic materials can be used. Exemplary of such binding agents are paraffin slack wax, carnuba wax, and lignosulfonates, such as ammonium lignosulfonate, sodium lignosulfonate, calcium lignosulfonate, and magnesium lignosulfonate.

Certain cellulosic materials can be added to the pellets as a pelletizing or processing aid. Preferred materials in this category are oil seeds and their products, which by their fatty acid content reduce wear on the dies of the pelletizing equipment. Exemplary of such materials which can be included are coconut husks, soy beans, peanuts, sunflower seeds, corn cake, pressing residuals, and the like.

As used herein, the term "pellet" refers to a discrete particle of any size or shape which contains both natural cellulosic material and synthetic thermoplastic material. The pellet need not be symmetrical, but it is preferred that the pellet 10 be substantially symmetrical in shape such as cylindrical, parallel-piped or the like, having a diameter within the range of from about 3/16 inch to about 1 inch. While it is most practical to form the pellets in a cylindrical shape, the pellets can be in any suitable symmetrical configuration such as the shape of a cube. Pellets have been produced which are cylindrical in shape, such as the pellet shown in FIG. 1, having a length of about 1 inch and a diameter of about ⅜ inch. For such a pellet, the "minimum dimension" of the pellet is the diameter, i.e. ⅜ inch.

The larger the diameter of the particles, the slower their burning rate. This is because of the fact that as the diameter increases, the surface area to volume ratio of the particles decreases. Depending upon the flame temperature and burning rate required in any given boiler, the optimum feed diameter for that boiler can vary within the range of about 3/16 inch to about 1 inch.

It is necessary that the particulate cellulosic feed and particulate synthetic thermoplastic feed have a maximum particle size less than about 60% of the minimum dimension of the pellet to avoid crumbling of the pellet in storage. For example, if the pellet is cylindrical and has a diameter of ¼ inch, then the cellulosic feed and thermoplastic feed should have a maximum particle size of about 0.15 inch (0.6×0.25), i.e. about 5 mesh.

The bulk density of the particles can vary in the range of from about 30 to about 40 pounds per cubic foot. It has been found that pellets 1 inch long and ¼ inch in diameter made from about 90% sawdust and about 10% polyethylene thermoplastic can have a bulk density of about 38 pounds per cubic foot.

A process for preparing fuel pellets is shown schematically in FIGS. 2A and 2B. Cellulosic feed material, plastic feed particles, and plastic feed sheet are delivered by trucks (not shown) and stored in storage bins 20a, 20b, and 20c, respectively. Additional feed storage bins can be provided for segregating different types of feed. The feed, either before or after introduction into the feed bins, can be treated to separate foreign materials such as metallic impurities and soil. This can be done by means of such equipment as pneumatic conveyors, screens, magnets, and combinations thereof. Magnets conventionally are built into the equipment, described below, used for comminuting the feed materials. The feed from the cellulosic feed storage bin 20a is transferred via a belt conveyor 24a to a classifying device such as a vibrating screen 26 to separate oversize particles 28 from particles 30 which are suitable for direct feed to a pelletizing operation. The size of the holes in the screen depend upon the size of the pellets to be made, but in any case, the size of the holes is necessarily smaller than the minimum dimension of the pellets. For example, if cylindrical pellets having a diameter of 3/16 inch are to be made, then the size of the holes in the screen is necessarily less than 3/16 of an inch. In the version of the process shown in FIG. 1, the screen segregates particles greater than ⅛ inch in diameter, and passes these particles to a comminution device such as a hammermill 32.

In the communition device, the feed cellulosic material is comminuted to a desired particle size. As used herein, the term "comminution" refers to any physical act of size reduction, including, but not limited to chopping, crushing, and grinding by suitable machinery. There are at least three types of machines useful for reducing the size of wood. Veneer and comparable fine scrap can be reduced to chips in a hammermill, in which rotating bars of various designs break up the material by impact. A disk chipper can be used for solid scrap and round wood of various sizes. This chipper has knives set in radial slots. A knife hog is similar in action to the chipper, but the knives are set in the sloping surfaces of a V-shaped drum. The knife is suitable for solid wood and for scraps that may be somewhat smaller than the disk chipper can handle. Preferred comminution equipment for the cellulosic waste is a hammermill sold by American Pulverizer Company of St. Louis, Miss. under the tradename American Swing Hammer.

In general, preferably the comminution device is operated so that substantially all of the cellulosic feed is comminuted to −5 mesh and at least 50% be weight is −10 mesh.

Exemplary of the operation of the hammermill 32 is comminuting cellulosic feed for making cylindrical pellets having a diameter of ⅜ inch and cylindrical pellets having a diameter of ¼ inch. For pellets having a diameter of ⅜ inch, preferably all of the particles are −5 mesh, and at least 50% of the particles are −10 mesh. If the pellets have a diameter of ¼ inch, then preferably all of the cellulosic material is comminuted to −10 mesh. Preferably, the comminuting equipment is operated so that substantially all of the particulate cellulosic material has a particle size greater than about 30 mesh. This is to avoid the presence of fines and dust in the feed to the pelletizer, and the explosion hazard associated with such small particles of cellulosic material.

The particles 30 not requiring comminution and the comminuted particles 34 from the hammermill 32 are collected on a belt conveyor 36 and passed via ducts 37 to two rotary dryers 38 in parallel to reduce the moisture content of the cellulosic material. To develop the necessary strength and hardness in the pellets, it is essential that the free moisture content of the cellulosic material be reduced to less than about 15% by weight. By "free moisture" there is meant moisture which can be removed by evaporation at normal temperatures and does not include any bound water such as chemically bound water that might be present in the feed material. Various types of dryers such as steam-heater plates, and dry steam pipes over which the feed is cascaded can be used to bring the feed to the desired moisture content. Flash dryers using a short exposure to hot gases can be used. The heat from drying can be provided by burning the fuel pellets and/or fines produced by this process in a heater 40 which supplies hot gas via ducts 41 to the dryers.

When the free moisture content of the cellulosic material is reduced to less than about 5% by weight, the pellets upon discharge from the pelletizer burst and demonstrate a "Christmas tree" effect. These pellets are unsatisfactory because they tend to form fines in storage and handling. This problem can be overcome by introducing steam, as necessary, at the pelletizer. However, it is undesirable to remove moisture from the cellulosic feed in a dryer, thereby expending energy for this purpose, only to put the moisture back into the feed at the pelletizer. Therefore, it is preferred that the free moisture content of the cellulosic material be reduced to no less than about 5% by weight. In summary then, preferably the dryers reduce the moisture content of the feed to about 5% to about 15% by weight, the same as required for feed to the pelletizer.

For high production rates from a pelletizer, and for production of pellets which exhibit excellent cohesiveness and high strength, preferably the free moisture content of the feed to the pelletizer is from about 8% to about 12% by weight, and most preferably about 10% by weight.

To aid in drying the cellulosic feed material, dry slaked lime, i.e. calcium carbonate, can be combined with the dryer feed. The calcium carbonate combines with water of the feed material and then releases moisture more easily in the dryer, thereby aiding more rapid drying of the feed material. Use of calcium carbonate in an amount of from about 2 to about 10% by weight of the feed, and preferably in an amount of about 5% by weight, significantly aids in the drying process. The preferred grade of calcium carbonate is a fine grade having a particle size of less than 100 mesh. When this drying technique is used, the product fuel pellets contain at least 1% by weight calcium.

It is believed that to make good pellets with bark, it is necessary to first comminute the bark, then dry the comminuted bark and then comminute the dried bark one more time before feeding to the pelletizer. This is because raw bark is usually available only as large particles which are difficult to dry efficiently.

Water can be removed from the feed material upstream of the dryers when the feed material contains gross quantities of water. For example, water can be removed from peat, bark, or sawdust with presses that operate on the roller or clothes-wringer principle. Screw presses, using tapered screws, are also useful for dewatering of bark. The drying operation can be run as a batch operation to avoid the expense of duplicating drying, cooling and conveying equipment for different cellulosic feed materials. The gases and water evolved in the dryers 38 are withdrawn from the dryers via lines 42 into two cyclones 44 in parallel, one for each dryer, by an exhaust fan 46. The discharge from the fan 46 can be passed to a dust collector (not shown) or passed directly to the atmosphere. Particulate matter withdrawn via line 42 is separated in the cyclones 44 and dropped into a fines bin 47. The particulate matter in bin 47 is fed by a rotary valve 48 to a fines bin 77 (FIG. 2A). The dried feed material is transferred by a storage bin tank feed conveyor 49 to one or more storage bins 52a or 52b (FIG. 2B). The different storage bins are used for storing different types of feed material. More storage bins than the two storage bins shown in FIG. 2A can be used. The storage bins 52a and 52b preferably are tumble bins to avoid compaction of the feed material and to maintain dehydration of the feed. A rotary cooler (not shown) using ambient air to cool the material discharged by the dryer can be used if required, to avoid caking of the feed material in storage.

The plastic feed is passed from the plastic feed bins 20b and 20c via belt conveyor 24b and 24c, respectively, to comminution devices such as granulators 56a and 56b, respectively. The smaller the particle size of the thermoplastic feed, the stronger the fuel pellets and the more even and uniform their burning characteristics, and the less plastic required in the fuel pellets. In addition, when the pellets are to be pulverized before burning, it is important that the plastic be comminuted to a small size so that each particle resulting from the pulverization contains both plastic and cellulosic material. Therefore, the granulators are operated so that substantially all of the particulate thermoplastic material is minus 5 mesh. Preferably, the bulk, i.e., at least 50% by weight of the particulate thermoplastic material is minus 10 mesh, and more preferably substantially all is minus 10 mesh. It is believed that optimumly substantially all of the plastic is −20 mesh. The comminuted plastic feed discharged by the granulators 56a and 56b passes to belts 57a and 57b, respectively, for transport to plastic feed storage bins 52c and 52d, respectively. More than two plastic storage bins can be used if required.

Each of the storage bins has associated with it a weigh belt conveyor 62a, 62b, 62c, or 62d. The four conveyors 62a, 62b, 62c, and 62d are used to provide the proper weight ratios of the feed materials to a pellet mill 70. The four conveyors drop their feed onto a belt conveyor 64 which carries it to a chamber 65 for preheating of the feed with dry steam, if desired. From the chamber 65 the feed passes into a mixer 66 such as a combination mill to obtain uniform mixing of the different types of feed material. The mixer discharges mixed feed onto a belt conveyor 67 which lifts the feed to a pellet mill feed bin 68. The feed is gravity fed from the bin 68 to a conveyor 69 which drops the feed into the pellet mill 70 in which the pellets of the present invention, such as a pellet shown in FIG. 1, are formed. Any suitable pelletizing machine can be used such as, for example, the one produced by the California Pellet Mill Company of San Francisco, Calif. or the mill produced by Koppers Sprout-Walden Company. In this apparatus, the material is fed into a hopper and pressed into dies having the desired configuration and shape.

The pellet mill must be capable of producing a pressure in the die during compression which causees the temperature of the feed material to increase so that the pellets have a temperature of from about 150° to about 250° F. where they are discharged from the pellet mill, i.e. where the pressure is released. When the discharged pellets are at a temperature in excess of about 250° F., degradation and carbonization of the thermoplastic material can occur, and when the discharged pellets are at a temperature of less than about 150° F., the pellets can have insufficient cohesiveness. Preferably, the discharge temperature of the pellets is from about 190° to about 210° F. to produce pellets with excellent burning properties and good cohesion. As the discharge temperature of the pellets increases, their density increases. For example, pellets containing 5% by weight polyethylene and 95% by weight sawdust had a density of 31 pounds per cubic foot when discharged from a pelletizer at 190° F., and a density of 34 pounds per cubic foot when discharged from the pelletizer at a temperature of 199° F.

Supplemental heat and moisture for the pellet mill 70 can be provided by steam 71 which can be generated in a boiler 72 fueled by pellets produced by this process or reject fines. The steam can be used for drying the feed in the dryers 38.

California pellet mills produce a high pressure at the impact point of the rollers to produce the desired temperature during pelletizing. A portion of the thermoplastic material forms a surface skin on the pellet at these temperatures. This skin protects the pellets from shattering and from significant changes in moisture content.

The temperatures and pressures required for making these pellets are substantially less than those described in U.S. Pat. No. 4,015,951 issued to Gunnerman. Therefore, it is expected that the pelletizing equipment used for forming pellets in this process will have a substantially longer life and require substantially less maintenance and fewer replacement dies than pelletizing equipment used according to the method described by Gunnerman.

Before introducing the feed to the pelletizer, it can be combined with a binding agent such as an aqueous solution of sodium silicate. For example, the material can be sprayed with about 5% by weight based on the total feed of 40 Baumé alkali stabilized sodium silicate solution added to the mixer 66. During the drying step, the moisture content needs to be adjusted to compensate for the water added by spraying with the silicate solution. It is believed that destabilized alkali sodium silicate solubilizes lignin of the cellulosic feed and the lignin then polymerizes, resulting in a stronger pellet.

From the pellet mill, the formed pellets are cooled in a cooler 72 by ambient air supplied by a blower 73, and transferred to a screen 74 for separation of any fines 75 which are carried by a conveyor 76 to a fines storage bin 77. The fines are transferred from the storage bin 77 by a rotary valve 78 and a blower 79 for feed to the boiler 72 used to generate steam for the pellet mill. The product pellets 80 can be sent to storage, bagged, or transferred to trucks or railroad cars for shipment.

The pellets prepared according to this process exhibit high heating value, which can be in excess of 10,000 BTU's per pound, are easily ignitable, burn rapidly, resist weathering, and are easy to store and handle. They are moisture resistant, and produce very little ash and essentially no oxides of sulfur on burning. Therefore, they are a premium fuel which in many respects is superior to coal. In general, because of the plastic, fuel pellets of the present invention have a heating value of over 1,000 BTU's per pound greater than the heating value of the cellulosic material in the pellet by itself. Also, by varying the amount of thermoplastic in the fuel pellet, the heating value of the pellet can be tailor-made for a customer's requirements. Pellets with a heating value of 15,000 BTU per pound have been made.

The fuel of the present invention can be comminuted before it is burned. Such comminution raises the flame temperature when the fuel is burned. Flame temperatures in excess of about 2500° F. can be achieved, particularly when less than about 150% stoichiometric air is used. Such high temperatures are valuable because they allow the fuel pellets of the present invention to be burned in applications requiring high temperature such as the manufacture of cement. It has been noted that it is difficult to burn conventional all-wood fuel pellets with less than 150% stoichiometric air and maintain clean stack gas.

These and other features of the present invention will become better understood with reference to the following examples.

EXAMPLE 1

Seven types of fuel pellets were prepared using seasoned Douglas fir sawdust and plastic feed. The sawdust was dried to a moisture content of less than 15% by weight in a dryer made by the Heil Company of Milaukee, Wis., Model Number 75-22. The sawdust was then comminuted to about minus 5 mesh in an Elms Hammermill equipped with a 50 horsepower motor, and operated at 3600 RPM. The plastic feed was also ground in the same hammermill. The ground plastic feed and ground sawdust were combined and fed to a California Pellet Mill, Model 125C. For each of the seven different types of pellets made, the plastic type, the plastic content of the pellets, bulk density of the pellets, and the pellet temperature as the pellets emerge from the die are reported in Table 2. The pellet temperature was measured by collecting a cubic foot of the pellets as they emerged from the die in a preheated container and inserting a preheated temperature probe into the container. The container was held 16 inches below the die discharge. The pellet temperature was recorded after the measured temperature stabilized. The pellets were cylindrical in shape, having a diameter of about ⅜ inch. Pellet number seven, which contained 10% by weight high impact polystyrene, was a very strong pellet, but was difficult to produce, and jammed the die. Therefore, only a small quantity of this type of pellet was produced. The sulfur content of the pellets ranged from 0.02% by weight up to 0.14% by weight. All the pellets had a heat content in excess of 8,000 BTU's per pound.

TABLE 2

| Pellet Number | Pellet Temp. (°F.) | Bulk Density (lb/ft) | Plastic Content (% weight) | Plastic[1] Type | Quantity Burned (pounds) |
|---|---|---|---|---|---|
| 1 | 190 | 40 | 5 | Low Density Polyethylene | 2700 |
| 2 | 195 | 41 | 5 | High Density Polyethylene with yellow dye | 600 |
| 3 | 198 | 38 | 10 | High Density Polyethylene | 2100 |
| 4 | — | — | 15 | High Density Polyethylene | 2160 |
| 5 | 195 | 35 | 10 | Virgin High Density Polyethylene | 540 |
| 6 | 208 | 40 | 10 | Polypropylene[2] | 1740 |
| 7 | — | — | 10 | High Impact Polystyrene | 0 |

[1]50% by weight —5 mesh.
[2]Reground battery casings.

The quantity of each type of pellet, as identified in Table 2 was burned in a boiler. The boiler used in the test had a 3-water wall furnace equipped with 3 spreader strokers and a vibrating grate. A forced draft fan forced air through the grate, and overfire air was used as an option. A dust collector was provided between the boiler exit and the stack. The unit had been used with coal firing and with all-wood pellets. The excess air meter was constant throughout the operation at about 75%.

Prior to operation on the pellets identified in Table 2, the boiler was operated with commercially available all-wood pellets. The all-wood pellets were burned without any overfire air because the overfire air caused turbulence which carried fines from the pellets out the stack. With the all-wood pellets, to avoid smoke, 75% excess air was required, and the grate was shaken every 45 minutes.

Number 1 pellets were burned for about 27 minutes, and the stack showed a light bluish smoke. Number 2 pellets were then burned for about 18 minutes, and the flame continued to be smoky. Number 3 pellets were then burned for about 40 minutes. The amount of smoke in the stack began to decrease. This was partially attributed to the use of overfire air, which was introduced about 8 minutes before starting up on the number 3 pellets. It is possible to use overfire air with fuel pellets of the present invention because they have few, if any, fines. The use of overfire air cleaned up the presence of smoke from the flame on the bed of fuel particles, and substantially decreased the amount of smoke in the stack. For unknown reasons, it was impossible to produce steam at a rate of 10,000 pounds per hour at 50 PSIG with the number 3 pellets.

The number 5 pellets were then burned for about 40 minutes, and an attempt was made to increase the steam rate to 15,000 pounds per hour. This resulted in an increase in smoke in the stack.

The number 6 pellets were then burned for about 20 minutes. The amount of smoke began to decrease, and very little smoke was present in the stack and above the fire in the boiler. Earlier problems involving a smoky flame, and pellets sticking on the grate, were no longer present. A steam rate of 15,000 to 17,000 pounds per hour resulted in stack temperatures of 600° F. At the end of the run, number 4 pellets were burned for 45 minutes. There was very good combustion in the furnace. The flames were very short, about 4" tall, and very intense. The flames with all-wood pellets were on the order of 12" to 15". The steam rate was 15,000 pounds per hour with a 590° F. stack temperature.

Based on the results of these tests, the following conclusions were reached:

(1) Overfire air is useful for cleaning up a smokey bed flame.

(2) It is tentatively believed that higher firing rates improve complete combustion without smoke, because higher firing rates were used with pellets numbers 4, 5 and 6, which produced less smoke.

(3) Smaller and/or shorter pellets burn faster. This conclusion is based on the results with the number 6 pellets which contained some fines.

Based upon the results of this test, it is postulated that reducing the input plastic size of the pellets is desirable because it would improve the lubricity in the pellet machine and reduce the tendency for a smoky flame. It is believed that distinct particles of plastic in the fuel pellets contribute to a smoky flame. Therefore, the particle size of the plastic should be reduced to a small a size as possible.

EXAMPLE 2

Using the same equipment as used for Example 1, fuel pellets were prepared from 90% by weight seasoned Douglas fir sawdust feed and 10% by weight high-density polyethylene. In a first test, the sawdust feed was dried to free moisture content of 14.7% by weight, and was then comminuted in the hammermill by using a ⅛" screen. The pellets produced were not as cohesive as desired, and quite a few fines were present.

In a second test, the same sawdust feed was dried to 18.5% moisture content, and comminuted in the hammermill using a 3/16" screen. Because of the high moisture content of the sawdust, the pellets from the pelletizer had insufficient cohesiveness and tended to crumble.

In a third test, the sawdust was dried to 4.4% moisture content and comminuted in the hammermill with a 3/16" screen. It was necessary to add steam at the pellet mill or else the pellets exhibited a "Christmas tree" effect.

In a fourth test, about 25 tons of pellets were satisfactorily produced where the sawdust feed was dried to a moisture content of an average of about 10.8% by weight. The screen size of the hammermill was about 3/16". The plastic used was high-density polyethylene ground to minus 5 mesh, 50% by weight minus 10 mesh. These pellets produced little, if any, fines, and were satisfactorily transferred by truck over 100 miles to the site of the boiler described in Example 1. The sawdust before drying had a moisture content of about 54% by weight.

A series of four tests were run under different operating conditions using the boiler of Example 1 to burn the 25 tons of pellets. During these four test, measurements were performed for stack emissions. Approved Environmental Protection Agency procedures were used (isokinetic sampling, etc.) and the effluent was filtered for particulate analysis and cooled in ice water for condensate collection. The stack gas was analyzed for oxygen and carbon dioxide content. Stack gas temperature was also recorded.

Prior to the tests, the furnace was operated on all-wood waste pellets, which made the transition to the pellets of the present invention fairly easy. No changes in operating conditions were required with the new fuel. There were some changes in the structure of the flames within the furnace. The height of the flames were considerably increased when compared to coal or all-wood pellets. During the test the tips of the flames were estimated to be in the 6 to 10 foot level versus 2 to 2½ feet for all-wood pellets. This is probably due to the evolution of combustible gases from the pellets. These gases rise through the combustion air and burn very much like a slow gas diffusion flame, resulting in the tall flames. All-wood pellets burn more like charcoal or coal with a low flame structure above the glowing pellets. Another characteristic of the flame structure is the higher flame temperature up to 2500° F., making the pellets satisfactory as a fuel for applications requiring high flame temperature such as cement manufacturing operations. These temperatures compare with 2100° F. to 2200° F. for a pellet made of all-wood waste. Temperatures of about 2900° F. have been attained by burning the pellets of this invention.

On the second of the four tests overfire air was used to see its effect on flame structure. Not much difference was observed except to lower the flame height somewhat. It is postulated that had the overfire jets been located at a higher level than the current 2½ feet, it may have reached the flame height more. This is based on previous observations of the effect of this overfire air on a flame structure of 2 to 3 feet flames.

It has been standard operating procedure with all-wood pellets to vibrate the grates for 2 to 3 seconds on 45 minute intervals. On test No. 3, this interval was shortened to 15 minutes. The stack gas, while completely acceptable, was not as clean as was observed on the regular schedule of grate vibration. The excess air drifted down somewhat during this test and the free oxygen at one time was down to 5% at 14.7% carbon dioxide. This would suggest that future tests should be run over longer periods at lower excess air levels to see if more satisfactory combustion can be obtained. If so, this would result in higher overall efficiency. Test results and fuel analysis are presented in Tables 3 and 4, respectively.

The test results with the Frajon fuel pellets were very good. No adjustments to operating conditions had to be made. All tests passed the EPA particulate emission standards. The average particulate emission level was 0.28 pounds per million BTU of heat imput. A very clean stack appearance was obtained with opacity values of 0, 0, 15 and 0. There were no visible emissions from the stack at any time except for the brief interval when the grates were being vibrated. Very good efficiencies were obtained compared to the experience with coal and plain wood pellets. At an average steam production rate of 27,900 lb/hr. of steam over a period of 10.25 hours, twenty-three tons of pellets were consumed. This amounts to an average steam yield of 6.22 pounds of steam per pound of fuel. This compares to steam yields of 4.7 and 5.0 for conventional wood pellets and coal, respectively, in the same boiler under comparable operating conditions. The heating value of the fuel was 9,160 BTU's per pound. The heat requirement was therefore 1,470 BTU's of heat input per pound of steam. It is believed that these results can be further improved by lowering the excess air that was used.

TABLE 3

SUMMARY OF TESTS

| Run No. | Steam Rate lbs./hr. | Overfire | Shake Grate Interval Minutes | Flame Temp. °F. | % $O_2$ Avg. in stock | % $CO_2$ Avg. in stock | Particulate gr./cu. ft. at 12% $CO_2$ | Stack Lbs. particulate per 10 BTU | Avg. °F. | Opacity |
|---|---|---|---|---|---|---|---|---|---|---|
| 1 | 28,100 | No | 45 | 2184 | 8.0 | 9.8 | 0.12 | 0.23 | 585 | 0 |
| 2 | 31,600 | Yes | 45 | 2294 | 6.2 | 11.6 | 0.12 | 0.26 | 620 | 0 |
| 3 | 34,400 | Yes | 15 | 2302 | 6.2 | 12.2 | 0.15 | 0.32 | 643 | 15 |
| 4 | 30,000 | No | 45 | 2415 | 8.3 | 9.9 | 0.13 | 0.30 | 643 | 0 |

TABLE 4

FUEL ANALYSIS

| Run No. | Moisture Percent | Sulfur Percent | Ash Percent | BTU/lb. | Bulk Density lbs./cu. ft. |
|---|---|---|---|---|---|
| 1 | 7.7 | less than 0.01 | 0.73 | 9106 | — |
| 2 | 7.5 | " | 0.73 | 8968 | — |
| 3 | 7.9 | " | 0.66 | 9382 | — |
| 4 | 7.7 | " | 0.78 | 9180 | — |
| AVG. | 7.7 | " | 0.72 | 9159 | 32.8 |

TABLE 5

COMPARISON OF FUELS

| Fuel | Fuel Analysis % Ash | Fuel Analysis % $H_2O$ | Fuel Analysis BTU/lb. | Stack* Temp. °F. | Ringelman* meter | Particulate* gr./scf at 12% $CO_2$ | Ashpit* residue % of fuel | lbs. steam* lbs. fuel |
|---|---|---|---|---|---|---|---|---|
| Coal | 10.2 | 2.2 | 10,760 | 610 | 8 | High | 24 | 4.95 |
| Conventional Wood Pellets | 1.9 | 11.0 | 7,050 | 620 | 0 | 0.13 | 3 | 4.70 |
| Pellets of Example | 0.7 | 7.7 | 9,160 | 620 | 0 | 0.13 | 1 | 6.22 |

*Same boiler used

Very good burn-out of the fuel was experienced. Less than a 20 gallon drum of ash was collected during the whole burn from 25 tons of fuel pellets. This is of the same order as the ash content of the fuel (0.7%). A comparison of the fuel pellets burned during this test, coal, and conventional wood pellets is presented in Table 5.

EXAMPLE 3

Pellets were successfully produced from Canadian sorghum peat, high density polyethylene, and high impact polystyrene using the same equipment as used for Example 1.

The moisture content, sulfur content, and gross heating value for the raw peat, the peat after drying, and the fuel pellets are presented in Table 6. The peat was dried and then comminuted with a 3/16" screen in the hammermill. The polyethylene and polystyrene were comminuted to minus 5 mesh, with 50% by weight of the particles − 10 mesh. The peat and plastic were mixed in proportions of 95 parts by weight dried peat, 4.5 parts by weight polyethylene and 0.5 parts by weight polystyrene. The mixture was formed into cylindrical pellets of ¼ inch diameter. Steam was used at the pelletizers.

TABLE 6

| Material | (% by weight) | | | Heat Content |
|---|---|---|---|---|
| | Moisture | Ash | Sulfur | BTU/lb |
| Raw peat | 35.5 | 8.3 | .08 | 5490 |
| Dried peat | 9.1 | 7.1 | .09 | — |
| Pellet | 9.3 | 6.5 | .09 | 9270 |

EXAMPLE 4

Using the same equipment as used for Example 1, six tons of fuel pellets were prepared from 97.5% by weight seasoned Douglas fir sawdust feed and 2.5% by weight high-density polyethylene. All of the polyethylene was ground to −10 mesh. The pellets were burned in the same boiler used for the pellets of Example 1. The pellets had handling and burning properties comparable to pellets containing 5% by weight thermoplastic. It is believed that the amount of thermoplastic required to produce a pellet of good handling and burning properties can be reduced as the particle size of the plastic is reduced.

Although the process and the pellets of the present invention have been described in considerable detail with reference to certain versions thereof, other versions are possible. For example, the pellets can be comminuted for use in pulverized coal burners or can be gasified. In addition, equipment other than a conventional pelletizer can be used for combining the plastic and cellulosic material to produce an intimate mixture of the cellulosic material and plastic. Therefore, the spirit and scope of the appended claims should not necessarily be limited to the description of the preferred versions contained herein.

What is claimed is:

1. A fuel pellet comprising from about 90 to about 99 percent by weight natural cellulosic material, and from about 1 to about 10 percent by weight particulate, synthetic polymeric thermoplastic material, the synthetic thermoplastic material being distributed as discrete particles throughout the fuel pellet, the thermoplastic material being solid at room temperature, being at least substantially minus 5 mesh, and having an injection molding temperature of at least 95° C., the cellulosic material having a free moisture content of from about 5 to about 15% by weight, and being at least substantially minus 5 mesh.

2. The fuel pellet of claim 1 wherein the thermoplastic material is selected from the group consisting of polystyrene, polyethylene, polypropylene, acrylonitrilebutadiene-styrene, acetal copolymer, acetal homopolymer, acrylic, polybutylene, and combinations thereof, and the thermoplastic material forms a sheath on the lateral surface of the pellet.

3. The fuel pellet of claim 1 including at least about one percent by weight calcium.

4. The fuel pellet of claim 1 wherein the cellulosic material includes at least one member selected from the class consisting of peat, bagasse, banana stalks, papaya stalks, and combinations thereof.

5. The fuel pellet of claim 1 wherein the cellulosic material includes oil seeds, products of oil seeds, or both.

6. The fuel pellet of claim 1 having a minimum dimension of about 4.75 mm.

7. The fuel pellet of claim 1 wherein the thermoplastic material is present in an amount of from about 2.5 percent to about 10 percent by weight.

8. The fuel pellet of claim 1 wherein the synthetic thermoplastic material sheaths the pellet on a lateral surface thereof to present a substantially hydrophobic surface, and the bulk of the particulate thermoplastic material is minus 10 mesh.

9. A method for preparing a fuel pellet from particulate natural cellulosic material and particulate synthetic polymeric thermoplastic material comprising the steps of:
(a) providing particulate natural cellulosic material having a free moisture content of from about 5 to about 15 percent by weight, and substantially all of the particulate cellulosic material being minus 5 mesh;
(b) providing particulate synthetic polymeric thermoplastic material which is solid at room temperature and has an injection molding temperature of at least 90° C., substantially all of the particulate thermoplastic material being minus 5 mesh;
(c) preparing a homogeneous feed comprising from about 90 percent to about 99 percent by weight of the particulate cellulosic material and from about 1 percent to about 10 percent by weight of the particulate thermoplastic material; and
(d) compressing and extruding the feed in a die at a pressure whereby the temperature of the resulting pellet as it emerges from the die is from about 66° C. to about 122° C., and substantially all the thermoplastic material within the pellet remains particulate and unmelted.

10. The method of claim 9 including the step of forming a substantially hydrophobic sheath of the thermoplastic on the pellet during the extrusion.

11. The method of claim 10 in which particulate thermoplastic material is selected from the group consisting of polystyrene, polyethylene, polypropylene, acrylonitrile-butadiene-styrene, acetal copolymer, acetal homopolymer, acrylic, polybutylene, and combinations thereof.

12. The method of claim 10 in which the step of providing particulate cellulosic material comprises combining particulate cellulosic material having a free moisture content greater than 55 percent by weight with calcium carbonate, and then drying the particulate cellulosic material to the prescribed free moisture content.

13. The method of claim 12 in which the particulate cellulosic material is combined with an amount of calcium carbonate equal to about 2 to about 10 percent by weight of the particulate cellulosic material.

14. The method of claim 13 in which the particulate cellulosic material is combined with an amount of calcium carbonate equal to about 5 percent by weight of the cellulosic material.

15. The method of claim 11 in which the particulate cellulosic material includes oil seeds, products of oil seeds, or both, for lubrication of the die.

16. The method of claim 11 in which the step of preparing a die feed comprises preparing a die feed including from about 2.5 to about 10 percent by weight of the particulate thermoplastic material.

17. The method of claim 11 in which the particulate cellulosic material is selected from the class consisting of peat, bagasse, banana stalks, papaya stalks, and combinations thereof.

18. The method of claim 9 including the step of combining the cellulosic material with alkali stabilized sodium silicate.

19. The method of claim 9 in which the particulate cellulosic material has a free moisture content of from about 8 to about 12 percent by weight.

20. The method of claim 9 in which the bulk of the particulate thermoplastic material is minus 10 mesh.

21. The method of claim 9 in which substantially all of the particulate thermoplastic material is minus 10 mesh.

* * * * *

UNITED STATES PATENT AND TRADEMARK OFFICE
CERTIFICATE OF CORRECTION

PATENT NO. : 4,236,897
DATED : Dec. 2, 1980
INVENTOR(S) : Ian Fraser Johnston

It is certified that error appears in the above—identified patent and that said Letters Patent is hereby corrected as shown below:

In the specification: Column 2, line 26, after "99%" insert --weight--; Column 3, line 20 "there" should be --these--; Column 5, line 55, "parallel-piped" should be --parallelepiped--; Column 6, line 46, "communition" should be --comminution--; Column 6, line 63, "Miss." should be --Missouri--; Column 6, line 67, "be" should be --by--; Column 9, line 14, "causees" should be --causes--; Column 11, line 24, "strokers" should be --stokers--; Column 12, line 22, "a" should be --as--; Column 12, line 31, at the end of the line the fraction should be --1/8"--; Column 12, line 58, "test" should be --tests--; Column 13, line 4 "were" should be --was--; Column 13, line 40, "reached" should be --reduced--; Column 13, line 66, "lower" should be --low--; Column 14, line 7, "imput" should be --input--; Column 15, line 10, "for" should be --of--.

In the claims: Column 16, line 1, claim 2, "trilebutadiene" should be --trile-butadiene--.

Signed and Sealed this

Fifth Day of May 1981

[SEAL]

Attest:

RENE D. TEGTMEYER

Attesting Officer  Acting Commissioner of Patents and Trademarks